United States Patent [19]

Green

[11] B 3,982,223

[45] Sept. 21, 1976

[54] COMPOSITE ACOUSTIC LENS

[75] Inventor: Philip S. Green, Redwood City, Calif.

[73] Assignee: Stanford Research Institute, Menlo Park, Calif.

[22] Filed: July 10, 1972

[21] Appl. No.: 270,274

[44] Published under the second Trial Voluntary Protest Program on February 17, 1976 as document No. B 270,274.

[52] U.S. Cl. .......... 340/8 L; 350/8
[51] Int. Cl.$^2$ .......... H04B 13/00
[58] Field of Search .......... 340/8 L; 350/8, 230, 350/231, 175 NG

[56] References Cited

UNITED STATES PATENTS

| | | | |
|---|---|---|---|
| 2,300,251 | 10/1942 | Flint | 340/8 L |
| 2,540,953 | 2/1951 | Kessler | 350/175 NG |
| 2,913,602 | 11/1959 | Joy | 340/8 L |
| 3,516,735 | 7/1970 | Goodell | 350/175 NG |
| 3,620,326 | 11/1971 | Hogge | 340/8 L |

OTHER PUBLICATIONS

Kock & Harvey, "Refracting Sound Waves," Journal of the Acoustical Society of America, Sept., 1949, pp. 471–481.

*Primary Examiner*—Samuel W. Engle
*Assistant Examiner*—Harold Tudor
*Attorney, Agent, or Firm*—Urban H. Faubion

[57] ABSTRACT

Composite acoustic lens assemblies which are adapted for use in a fluid medium and utilized for forming acoustic images with incident acoustic waves or focusing incident acoustic waves are constructed utilizing two or more lens elements with a fluid filler medium contained therebetween. In order to reduce the radius of curvature of the lens elements to such an extent that mode conversion at liquid/solid interfaces is substantially eliminated while providing the required image or focusing, the materials of the lens medium and the liquid medium between the lens elements are selected so that the velocity of propagation of acoustic waves in the medium, at least on one side of the composite acoustic lens is intermediate the velocity of propagation of acoustic waves in the media of the lens elements and the fluid filler. In a preferred embodiment, lens elements are selected so that the velocity of propagation of acoustic waves therein is greater than the velocity of propagation of the acoustic waves in the wave transmitting medium surrounding the lens assembly and the lens filler medium is selected so that the velocity of propagation of acoustic waves is less than their velocity in the surrounding wave transmitting medium.

17 Claims, 2 Drawing Figures

COMPOSITE ACOUSTIC LENS

BACKGROUND OF THE INVENTION

The application of acoustic lenses which, in terms of accurate undistorted imaging and focusing, is most exacting is that of nondestructive imaging or testing. For "real-time" ultrasonic imaging of organs in a living organism, e.g., such as a heart in a living human body, it is important to be able to sequester all acoustic waves containing image information and produce the "acoustic image" with an absolute minimum of distortion and loss of acoustic energy. The composite lens assembly described here is specifically designed and constructed for such use and, therefore, the description is made in connection with this most demanding application of acoustic lenses. However, it will be particularly understood that the structures and principles are applicable in many other uses of acoustic imaging and focusing. For example, a good application is for focusing acoustic waves generated by a transducer.

A major loss of acoustic energy which would otherwise be available for acoustic imaging is caused by mode conversion at the interface between a liquid transmitting the acoustic waves and a solid, such as a lens element. Specifically, we are concerned with a conversion of an incident compressional wave, which can be translated to a meaningful and useful acoustic image, to a shear wave which in most systems is useless and in some measure is counterproductive. Because of the balance of shear strain at the liquid/solid boundary, there is no mode conversion when the incident compressional wave is normal to the surface of the solid encountered. However, as the angle of incidence is increased, more of the compressional wave is converted to shear wave energy and, indeed, there is an angle (called the critical angle) at which an incident compressional wave is substantially totally transformed into a shear wave.

Thus, the acoustic lens designer is confronted with the problem of producing a lens element or elements having a sufficiently small (short) radius of curvature to provide the proper imaging and focusing action without presenting such a steep liquid interface as to convert an appreciable amount of the incident compressional wave energy to energy in the form of shear waves.

In regard to acoustic lens design, there is a close analogy between reflection and refraction of optical and acoustic wave fronts at boundaries separating regions of different refractive index; therefore, acoustic lenses and reflectors are designed in accordance with the same procedures used in optics. With few exceptions, the analogy between acoustics and optics extends to all scalar propagation phenomena. As might be expected, there exists for an acoustical lens or focusing reflector an image-plane/object-plane relationship that is identical to that found in optics. Specifically, a spatial pattern of acoustic pressure in a plane in front of an acoustic lens (and propagating toward it) induces in a conjugate plane of the lens a diffraction and aberration limited replica of itself.

In view of the analogy between acoustics and optics, the general theory of lens design (and, in fact, practical lens design) is well understood for ultrasonic lenses. Therefore, an extended explanation of principles of lens design is not given here. Only those principles of acoustic lens design which constitute part of this invention and which are not found in the tutorials on ultrasonic lenses is emphasized. For the principles of general acoustic lens design, one may refer to texts such as SONICS by Heter and Bolt, John Wiley and Sons, publishers, 1955, p. 265, "Sound Focussing Lenses and Waveguides," T. Tarnoczy, ULTRASONICS, July--September 1964–1965, pp. 115–127, and "The Aberrational Characteristics of Acoustic Lenses," B. D. Tartakovskii, SOVIET PHYSICS-ACOUSTICS Vol. 8, No. 3, January–March 1963.

SUMMARY OF INVENTION

In accordance with the present invention, a composite acoustic lens intended for use in liquid media is provided with two or more solid lens elements which include therebetween a liquid filler medium. The materials of the composite acoustic lens are so chosen that the velocity of propagation of acoustic waves in the medium on at least one side of the composite acoustic lens is intermediate of the velocity of acoustic waves in the media of acoustic lens elements and in the liquid filler medium. By proper selection of the relative velocity of propagation of acoustic waves in the lens element, the surrounding liquid medium, and the liquid lens filler medium in the composite lens, the radius of curvature of solid lens elements is signficantly increased, and, in fact, increased to such an extent that mode conversion at the liquid solid interfaces is substantially eliminated while the required imaging or focusing is provided.

The novel features which are believed to be characteristic of the invention are set forth with particularity in the appended claims. The invention itself, however, both as to its organization and method of operation, together with further objects and advantages thereof may best be understood by reference to the following description taken in connection with the accompanying drawing.

DESCRIPTION OF PREFERRED EMBODIMENT

Figure 1:
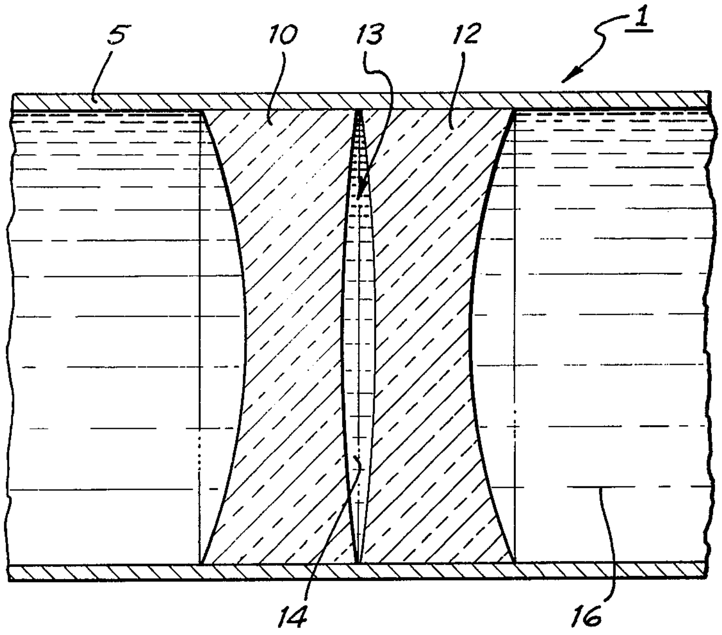
FIGS. 1 and 2 are central, vertical, longitudinal sections through lenses and illustrate the concept of the invention utilizing two different lens configurations.

A preferred embodiment of a composite acoustic lens, and one which is used to describe their application, is illustrated in FIG. 1. Focusing action for the acoustic lens illustrated is provided by two solid lens elements 10 and 12, which are both generally biconcave in shape, joined at their outer periphery so that a cavity 13 is formed therebetween. The cavity 13 is filled with a liquid filler medium 14. The composite acoustic lens is intended to be used in a liquid medium, therefore, it is illustrated as being housed in a generally cylindrical tube 15 (shown broken away at both ends) which contains the liquid medium 16 (called the surrounding liquid medium).

In the preferred embodiment, the material of the lens elements 10 and 12 is selected so that the velocity of acoustic waves therein is high as compared to the velocity of those waves in the surrounding medium, hence, the concave or biconcave lens configuration. This general configuration is preferred since acoustic lens designers (see Tarnoczy and Tartakovskii, supra) generally agree that a concave lens (accelerating acoustic lens) produces less aberration and reflection than a convex (decelerating) one and it is, therefore, better to make lenses of substances in which the velocity of propagation is greater than in the surrounding environment.

In order to produce the proper focusing effect, the radius of curvature of the concave lens surfaces, e.g., surfaces of concave lenses 10 and 12 must generally be fairly short, and, therefore, the faces of each lens must have a large curvature. It is well known that if sound waves pass between a liquid and solid obliquely, not perpendicularly, shear waves are generated in the solid in addition to the longitudinal waves. The phenomena is known as mode conversion. This invention specifically provides for the reduction of mode conversion while still providing the refraction necessary to provide the proper focusing action.

In point of fact, the lens design reduces all of the recognized disadvantages of acoustic lenses, which are; energy loss due to mode conversion, energy absorption of the materials, aberrations and reproduction errors caused by internal heating.

Energy absorption is minimized in part by judicious selection of the material of the solid lens elements 10 and 12. For example, polystyrene is selected as the lens material for its low sound absorption characteristics, i.e., low as compared to such materials as lucite and glass and also because of its low reflectivity in water. Aberrations are minimized by design parameters and utilization of the accelerating lens arrangement.

Means and structures of the present invention allow reduction of the curvature of the lens elements required for focusing. Thus, energy loss and internal heating due to mode conversion and absorption are minimized. Further, by reducing the required lens curvature, the thickness of the lens elements is decreased, resulting in a further reduction in energy absorption. Mode conversion and energy absorption, incidentally, are responsible for internal heating which causes reproduction errors.

These advantages are achieved by properly selecting the materials of liquid filler medium 14, the material of the solid lens elements 10 and 12, and the surrounding liquid medium 16. For the system illustrated, water is chosen as the surrounding liquid medium 16 because it is one of the best media known for coupling to biological materials since their specific acoustic impedance is approximately equal to that of water. In fact water is a common and generally convenient material as a surrounding medium. As previously indicated, the material of the solid lens elements utilized is polystyrene.

Freons, silicone oils and fluorinated hydrocarbons are among the possible choices for the filler medium 14. Of particular merit are the commercially available fluorinated hydrocarbons of the family given the name Fluorinert by its manufacturer, Minnesota Mining and Manufacturing Company. Specifically, the fluorinated hydrocarbon FC75 is a good choice for the liquid filler medium 14. Acoustic waves with a frequency of 3.5 megaherz (frequency for which the system was designed) have a velocity of 2400 meters per second in polystyrene, 1500 meters per second in water and 600 meters per second in FC75. The mean density of polystyrene is 1.1 gram per cc, that for the distilled water is approximately 1 gram per cc at 25°C and the density of FC75 is 1.77 gram per cc.

The acoustical properties of polystyrene (lens elements) or the materials for the filler medium 14 alone do not differ enough from water to limit lens curvatures but the proper combination of these materials produce a powerful effect. Note that selection of materials for the lens elements 10 and 12, liquid filler medium 14 and surrounding liquid medium 16 is made so that the velocity of propagation of the incident acoustic waves in the medium at least on the side of the composite acoustic lens where sound waves are incident is intermediate the velocity of propagation of the acoustic waves in the media of the lens elements 10 and 12 and the fluid filler medium 14. In the acoustic lens illustrated in FIG. 1, the velocity of the propagation of the acoustic waves is higher in the solid lens elements 12 and 14 than in the surrounding liquid medium 16 and, therefore, the filler medium 14 is selected such that the velocity of propagation of sound waves therein is lower than that in the surrounding liquid medium 16. As a refinement, resolution may be improved by the use of the filler medium 16 (FC75 here) on the image side of the lens 1 instead of water.

In order to obtain a better understanding of the effectiveness of the invention, compare two different acoustic lens assemblies each having a focal length of 5 inches, each designed to operate in water as the surrounding liquid medium, and each having a pair of symetrical double concave polystyrene lens elements 10 and 12. The one lens uses water as a filler medium 14 and its lens surfaces have radii of curvature of 7.24 inches. When the fluorinated hydrocarbon FC75 is used as the filler medium, the lens surfaces have radii of curvature of 22.2 inches.

Thus, it is seen that the use of the arrangement described has reduced the curvature of the lenses considerably. That is to say that the curvatures of the face of the lens elements 10 and 12 are considerably reduced for a given focusing action. This is a result of the fact that considerable refraction is effected at the internal boundaries between liquid filler medium 14 and the solid lens elements 10 and 12 owing to the great disparity of velocity of propagation of the acoustic waves in the solid lens elements 10 and 12 and the entrained liquid filler element 14. Reduction of lens curvature is, in fact, sufficient significantly to reduce the required lens thickness which results in far less energy absorption in the lens and reduces aberration. Further, the ratios of indices of refraction of the materials are made large, resulting in reduced aberration for the given focal length lens (see Drude, THE THEORY OF OPTICS, Dover Publications Inc., 1959).

In one practical design for a major application of the invention, the lens elements 10 and 12 have an outside diameter of 9.5 inches with the area of curvature having a diameter of 8.5 inches. The radius of curvature of the lenses 10 and 12 which is adjacent the surrounding medium 16 is 12.6 inches and the radius of curvature of the opposite faces (adjacent the liquid filler medium 14) is 36.4 inches. These dimensions give the composite acoustic lens 1 a focal length of about 6 inches.

The principle of the invention can also be applied to decelerating lenses. The composite acoustic lens shown in FIG. 2 may be referred to for an illustration of this point. Again consider the composite acoustic lens 20 as being surrounded by water as the liquid medium 21. The material of the lens elements 22 and 24 in this case is selected so that the velocity of impinging acoustic waves is slower therein than in the surrounding liquid medium 21. Since the velocity of the acoustic waves is slower in the lens elements 22 and 24 than in the surrounding liquid mediun, the acoustic lens elements must be convex (in this case double convex). In order to provide the proper imaging action without having the curved faces of the lens elements so steep as to introduce appreciable mode conversion the two lens elements 22 and 24 again include a filler medium 25 therebetween. In this case the liquid filler medium 25 is so selected that the velocity of acoustic waves of interest is greater than in the surrounding medium 21.

Thus again the materials of the lens elements 22 and 24 and the material of the liquid filler medium 25 are selected so that the velocity of propagation of acoustic waves in the surrounding liquid (at least on the side of incidence of sound waves) is intermediate that of the other two media. Again, a generally cylindrical housing 26 is provided as an enclosure of the composite acoustic lens 20 in a liquid tight manner so that the liquid filler medium 25 and the surrounding liquid medium 21 does not escape.

Figure 2:
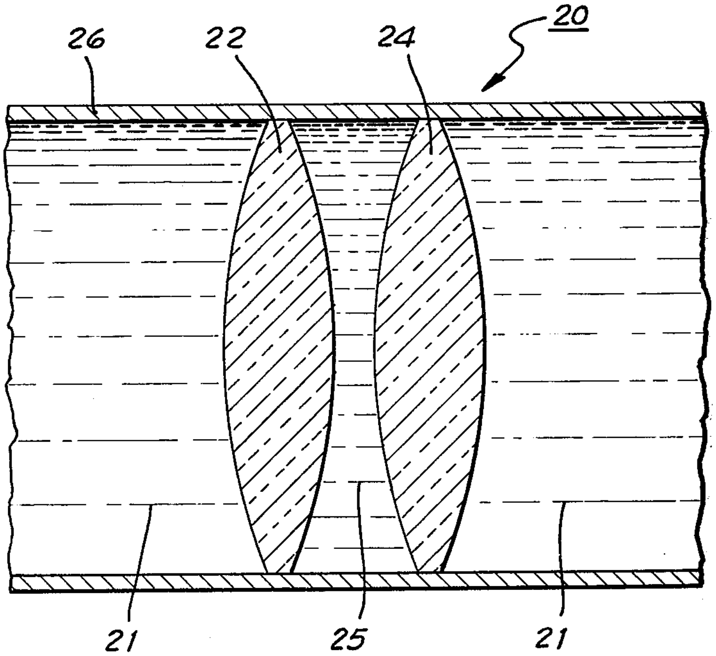

The acoustic lenses of FIGS. 1 and 2 are highly practical and have been used to illustrate the broad principles of the invention; however, the principles can be extended to composite acoustic lenses of many different configurations without departing from the invention. For example, any number of lens elements may be included in the lens or other element configurations (e.g., plane-o-concave, convex-o-concave, etc.) may be used or individual lens elements may be made up of a combination of lenses all without departing from the broad principles of the invention. Further, stops may be included as by interposing them between lens elements to reduce aberration and lens surfaces may be treated to reduce reflection. It is known, for example, that lens surfaces may be coated or etched (to provide indentations or surface pores) to reduce reflection by the interference principle.

That is to say, that while particular embodiments of the invention are illustrated and described, the invention is not limited to these specific configurations since many modifications in composite acoustic lenses may be made utilizing the inventive principles. It is contemplated that the appended claims will cover any such modifications as fall within the true spirit and scope of the invention.

What is claimed is:

1. A composite acoustic lens adapted for use in fluid media including at least a pair of lens elements composed of a solid lens medium and a liquid filler medium included between said pair of lens elements, the materials of said lens medium and fluid filler medium being selected so that the velocity of propagation of acoustic waves in the medium on at least one side of the said composite acoustic lens is intermediate the velocity of the acoustic waves in the media of the lens and the filler, said lens element material being selected so that acoustic waves have a velocity of propagation therein which is higher than their velocity of propagation in the said medium on at least one side of the said composite acoustic lens.

2. A composite acoustic lens, as defined in claim 1, wherein said lens elements are double concave.

3. A composite acoustic lens, as defined in claim 1, wherein the ratio of the velocity of propagation of acoustic waves in said solid lens medium to the velocity of propagation in said liquid filler medium is at least 2 to 1.

4. A composite acoustic lens, as defined in claim 3, wherein said solid lens elements are double concave.

5. A composite acoustic lens, as defined in claim 1, wherein said solid lens medium comprises polystyrene.

6. A composite acoustic lens, as defined in claim 5, wherein said liquid filler medium comprises fluorinated hydrocarbon.

7. A composite acoustic lens adapted for use in fluid media including at least a pair of lens elements composed of a solid lens medium and liquid filler medium included between said pair of lens elements, the materials of said lens medium and fluid filler medium being selected so that the velocity of propagation of acoustic waves in the medium on at least one side of the said composite acoustic lens is intermediate the velocity of the acoustic waves in the media of the lens and the filler, said lens element material being selected so that acoustic waves have a higher velocity of propagation therein than their velocity of propagation in the surrounding medium at least on the side of impinging acoustic waves.

8. A composite acoustic lens, as defined in claim 7, wherein said lens elements are double concave in configuration.

9. A composite acoustic lens adapted for use in fluid media including at least a pair of lens elements composed of a solid lens medium and a liquid filler medium included between said pair of lens elements, the materials of said lens medium and fluid filler medium being selected so that the velocity of propagation of acoustic waves in the medium on at least one side of the said composite acoustic lens is intermediate the velocity of the acoustic waves in the media of the lens and the filler, said lens element material being selected so that acoustic waves have a velocity of propagation therein which is lower than their velocity of propagation in the said medium on at least one side of the composite acoustic lens.

10. A composite acoustic lens, as defined in claim 9, wherein said lens elements are double convex in configuration.

11. A composite acoustic lens adapted for use in fluid media including at least a pair of lens elements composed of a solid lens medium and a liquid filler medium included between said pair of lens elements, the materials of said lens medium and fluid filler medium being selected so that the velocity of propagation of acoustic waves in the medium on at least one side of the said composite acoustic lens is intermediate the velocity of the acoustic waves in the media of the lens and the filler, said lens element material being selected so that acoustic waves have a velocity of propagation therein, which is lower than their velocity of propagation in the said surrounding medium on the side of the impinging acoustic waves.

12. A composite acoustic lens, as defined in claim 11, wherein said lenses are double convex in configuration.

13. A composite acoustic lens adapted for use in a given surrounding medium in which acoustic waves have a first given velocity of propagation, said composite acoustic lens including at least a pair of lens elements composed of a solid lens medium in which sound waves have a second given velocity of propagation and filler medium included between said pair of lens elements composed of a material in which acoustic waves have a third given velocity of propagation which differs from the said first and second velocity of propagation, the material of said filler medium and said lens element medium being selected such that the velocity of acoustic waves in the surrounding medium lies between the velocity of acoustic waves in the lens and filler medium, said lens material being selected so that the said second velocity of propagation is higher than the said first velocity of propagation.

14. A composite acoustic lens, as defined in claim 13, wherein the ratio of the velocity of the propagation of acoustic waves in said solid lens medium to the velocity of propagation in said liquid filler medium is at least 2 to 1.

15. A composite acoustic lens, as defined in claim 14, wherein said solid lens elements are double concave.

16. A composite acoustic lens, as defined in claim 13, wherein said solid lens medium comprises polystyrene.

17. A composite acoustic lens, as defined in claim 16, wherein said filler medium comprises fluorinated hydrocarbon.

* * * * *